United States Patent
Durrant

(10) Patent No.: US 6,732,250 B2
(45) Date of Patent: May 4, 2004

(54) MULTIPLE ADDRESS TRANSLATIONS

(75) Inventor: Paul Durrant, Slough (GB)

(73) Assignee: Sun Microsystems, Inc., Santa Clara, CA (US)

( * ) Notice: Subject to any disclaimer, the term of this patent is extended or adjusted under 35 U.S.C. 154(b) by 87 days.

(21) Appl. No.: 10/071,045

(22) Filed: Feb. 8, 2002

(65) Prior Publication Data

US 2003/0028746 A1 Feb. 6, 2003

(30) Foreign Application Priority Data

Jul. 31, 2001 (GB) .............................................. 0118657

(51) Int. Cl.$^7$ .............................................. G06F 12/00
(52) U.S. Cl. ........................ 711/202; 711/205; 711/203
(58) Field of Search ................................ 711/202, 200, 711/205, 206, 207, 162, 221, 203

(56) References Cited

U.S. PATENT DOCUMENTS

| | | | | |
|---|---|---|---|---|
| 3,670,309 A | * | 6/1972 | Amdahl | .................... 340/172.5 |
| 3,970,999 A | | 7/1976 | Elward | |
| 5,133,059 A | * | 7/1992 | Ziegler | ........................ 711/140 |
| 5,442,766 A | | 8/1995 | Chu et al. | |
| 5,696,925 A | | 12/1997 | Koh | |
| 5,721,858 A | | 2/1998 | White et al. | |
| 5,860,146 A | * | 1/1999 | Vishin | ........................ 711/207 |
| 6,073,226 A | * | 6/2000 | Cutshall | ...................... 711/203 |
| 6,226,733 B1 | | 5/2001 | Belgard | |
| 6,240,501 B1 | * | 5/2001 | Hagersten | ...................... 711/202 |
| 6,363,462 B1 | * | 3/2002 | Bergsten | ...................... 711/162 |
| 6,366,996 B1 | * | 4/2002 | Hobson | ...................... 711/206 |
| 6,430,667 B1 | | 8/2002 | Loen | |
| 6,493,812 B1 | * | 12/2002 | Lyon | .......................... 711/207 |
| 2001/0025336 A1 | * | 9/2001 | Hirai | .......................... 711/206 |

FOREIGN PATENT DOCUMENTS

| | | |
|---|---|---|
| EP | 0526114 A1 | 7/1992 |
| EP | 0817059 A1 | 6/1997 |

* cited by examiner

*Primary Examiner*—Kimberly McLean-Mayo
(74) *Attorney, Agent, or Firm*—Meyertons Hood Kivlin Kowert & Goetzel, P.C.

(57) ABSTRACT

A computer system includes memory and at least a first processor that includes a memory management unit. The memory management unit includes a translation table having a plurality of translation table entries for translating processor addresses to memory addresses. The translation table entries provide first and second memory address translations for a processor address. The memory management unit can enable either the first translation or the second translation to be used in response to a processor address to enable data to be written simultaneously to different memories or parts of a memory. A first translation addresses could be for a first memory and a second translation addresses could be for a second backup memory. The backup memory could then be used in the event of a fault.

33 Claims, 14 Drawing Sheets

MULTIPLE ADDRESS TRANSLATIONS

BACKGROUND OF THE INVENTION

The invention relates to providing multiple address translations, for example for generating a memory image.

A particular application of the invention is in the context of fault tolerant computing systems. The invention is, however, not limited in its application to such systems.

The generation of a memory image is needed, for example, where it is necessary to establish an equivalent memory image in a fault tolerant computer system such as a lockstep fault tolerant computer that uses multiple subsystems that run identically. In such lockstep fault tolerant computer systems, the outputs of the subsystems are compared within the computer and, if the outputs differ, some exceptional repair action is taken. That action can include, for example, reinstating the memory image of one subsystem to correspond to that of another subsystem.

U.S. Pat. No. 5,953,742 describes a fault tolerant computer system that includes a plurality of synchronous processing sets operating in lockstep. Each processing set comprises one or more processors and memory. The computer system includes a fault detector for detecting a fault event and for generating a fault signal. When a lockstep fault occurs, state is captured, diagnosis is carried out and the faulty processing set is identified and taken offline. When the processing set is replaced a Processor Re-Integration Process (PRI) is performed, the main component of which is copying the memory from the working processing set to the replacement for the faulty one.

International patent application WO 99/66402 relates to a bridge for a fault tolerant computer system that includes multiple processing sets. The bridge monitors the operation of the processing sets and is responsive to a loss of lockstep between the processing sets to enter an error mode. It is operable, following a lockstep error, to attempt reintegration of the memory of the processing sets with the aim of restarting a lockstep operating mode. As part of the mechanism for attempting reintegration, the bridge includes a dirty RAM for identifying memory pages that are dirty and need to be copied in order to reestablish a common state for the memories of the processing sets.

In these prior systems, the control of the reintegration is controlled by software. However, as the systems grow in size, the memory reintegration process becomes more time consuming.

Accordingly, an aim of the present invention is to enable the generation of a memory image in a more efficient manner.

SUMMARY OF THE INVENTION

Particular aspects of the invention are set out in the accompanying independent and dependent claims.

One aspect of the invention provides a computer system comprising memory and at least a first processor that includes a memory management unit. The memory management unit includes a translation table having a plurality of translation table entries for translating processor addresses to memory addresses with at least one translation table entry providing at least a first memory address translation and a second, different, memory address translation for a processor address.

The provision of a memory management unit providing multiple translations for a given processor generated address (hereinafter processor address) means that the memory management unit can identify multiple storage locations that are relevant to a given processor address. The processor can, for example, be provided with instructions defining, for example, the copying of a memory location to another location without needing separately to specify that other location. Preferably, all of the translation entries can provide first and second translations for a processor address.

The memory management unit can be operable selectively to enable either the first translation or the second translation to be used in response to the processor address, to provide selectable addressing of different parts of memory. Also, the memory management unit can be operable selectively to enable both the first translation and the second translation to be used in response to the processor address to provide simultaneous addressing of different parts of memory. The memory management unit can include status storage, for example one or more bits in a translation table entry that contain one or more indicators as to which of the first translation and the second translations are to be used in response to a processor address for a given address and/or instruction generating principal (e.g., a user, a program, etc.).

One application of the invention to high reliability computers, the first translation addresses a first memory and the second translation addresses a second memory, separate from the first memory. These could be in the form of a main memory and a backup memory, the backup memory being provided as a reserve in case a fault develops in the main memory.

In one embodiment of the invention, the first memory is a memory local to the first processor and the second memory is a memory local to a second processor interconnected to the first processor via an interconnection. In a particular embodiment of the invention, the interconnection is a bridge that interconnects an IO bus of the first processor to an IO bus of the second processor In such an embodiment, during a reintegration process following a loss of lockstep, the memory management unit of a primary processor can be operable in response to a replication instruction at a processor address to read from a first memory location in the first memory identified by the first translation for the processor address and to write to a second memory location in the second memory identified by the second translation for the processor address.

Alternatively, the memory management unit can be operable in response to a replication instruction at a processor address to read from a first memory location in the first memory identified by the first translation for the processor address and to write to the first memory identified by the first translation and to a second memory location in the second memory identified by the second translation for the processor address.

In another embodiment, the first memory is a main memory for the first processor and the second memory is a backup memory. The second memory can be a memory local to a second processor interconnected to the first processor via an interconnection. For example the interconnection could be a bridge that interconnects an IO bus of the first processor to an IO bus of the second processor, or could be a separate bus.

The memory management unit can be operable in response to a read instruction at a processor address to read from a first memory location in the first memory identified by the first translation for the processor address and is operable in response to a write instruction at a processor address to write to a first memory location in the first memory identified by the first translation and to a second memory location in the second memory identified by the second translation for the processor address.

In one embodiment, the computer system comprises a plurality of processors interconnected by an interconnection, each processor comprising a respective memory management unit that includes a translation table having translation table entries providing at least first and second memory translations for a locally generated processor address each first memory translation relating to the memory local to the processor to which the memory management unit belongs, and each second memory translation relates to the memory local to the another processor. In a fault tolerant computer, the plurality of processors can arranged to be operable in lockstep.

An embodiment of the invention can also include an IO memory management unit, the IO memory management unit including a translation table with a plurality of IO translation table entries for translating IO addresses to memory addresses, wherein at least one IO translation table entry provides at least a first memory address translation and a second, different, memory address translation for an IO address.

Another aspect of the invention provides a method of generating an image of locations in a memory of a computer. The method includes: a first processor generating predetermined instructions identifying processor addresses; and a memory management unit responding to a said processor address by providing, from a translation table entry for the processor address, a first translation of the processor address for a read from a first memory location; reading of the content of the first memory location; the memory management unit further providing from said translation table entry for said processor address, a second translation of the processor address for a write of the content the first memory location to a second memory location; and writing of the content of the first memory location to a second memory location.

BRIEF DESCRIPTION OF THE DRAWINGS

Embodiments of the present invention will be described hereinafter, by way of example only, with reference to the accompanying drawings in which like reference signs relate to like elements and in which.

DESCRIPTION OF PARTICULAR EMBODIMENTS

Embodiments of the present invention are described, by way of example only, in the following with reference to the accompanying drawings.

Figure 1:
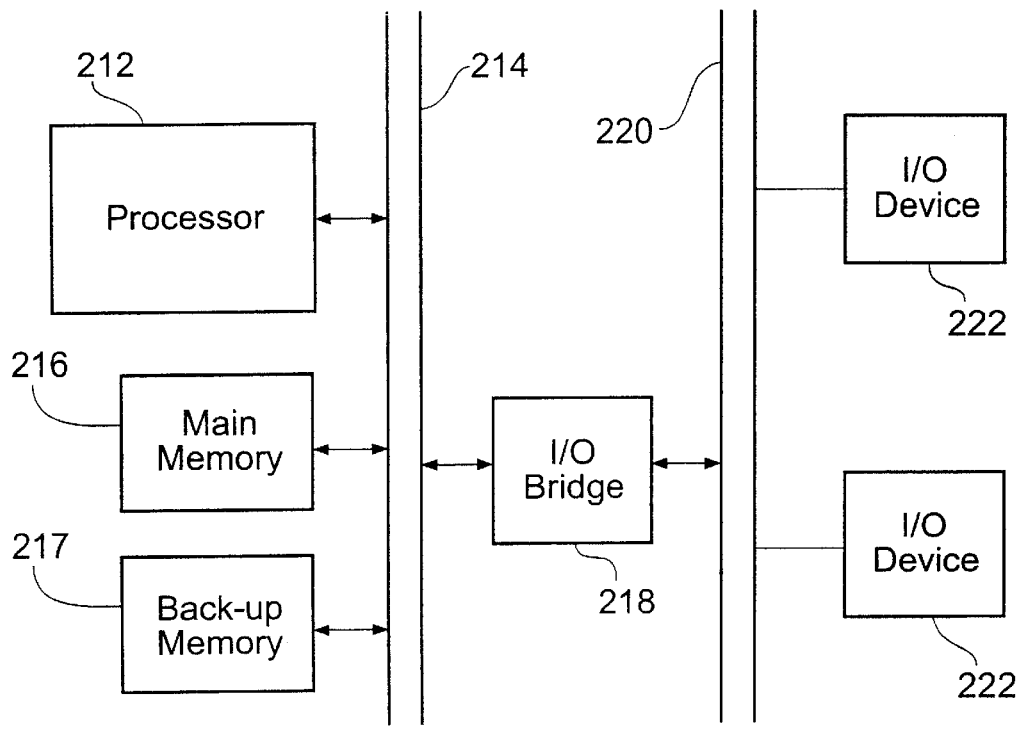
FIG. 1 is a schematic overview of a computer system forming an embodiment of the invention.

FIG. 1 is an overview of a computer system 210 forming an embodiment of the invention that includes a processor 212, a processor bus 214 to which are attached a plurality of subsystems including main random access memory (main memory) 216, a backup (or mirror) memory 217 and an IO bridge 218. The processor 212 can typically be integrated in a single integrated circuit. The IO bridge 218 provides an interface between the processor bus 214 and an IO bus 220 to which a plurality of IO devices 222 can be connected.

Figure 2:
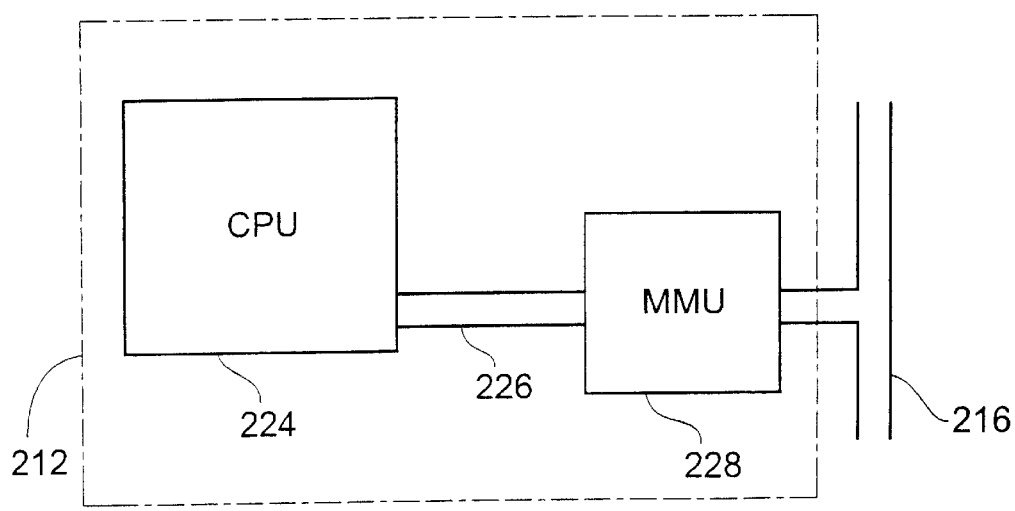
FIG. 2 is a schematic overview of a processor of the computer system of FIG. 1.

FIG. 2 is a schematic overview of a processor such as the processor 212 of FIG. 1. This includes a central processing unit (CPU) 224 connected via an internal bus 226 to a memory management unit (MMU) 228. The CPU 224 is operable to output processor addresses (virtual addresses) on the internal bus 226 that are then converted by the MMU 228 into physical addresses for accessing system resources including the memory 216 and the IO devices 222.

Figure 3:
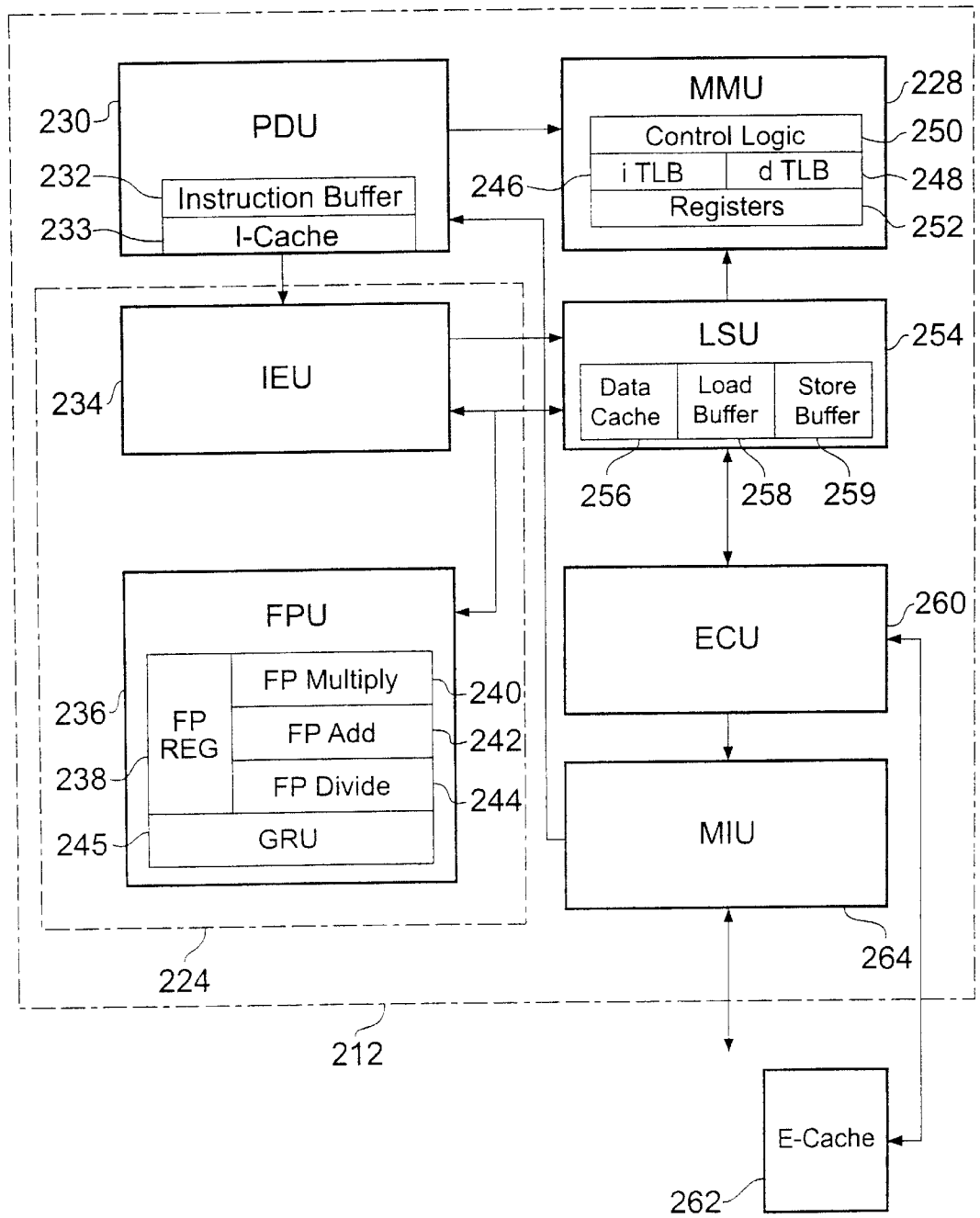
FIG. 3 is a schematic block diagram of a known type of processor.

The design of a processor 212 for an embodiment of the invention can be based on that of a conventional processor, but including a modified memory management unit as will be described hereinafter. FIG. 3 is a schematic block diagram of one type of processor 212, namely an UltraSPARC™ processor marketed by Sun Microsystems, Inc. Further details of the UltraSPARC™ processor can be found, for example, in the UltraSPARC™ I&II User's Manual, January 1997, available from Sun Microsystems, Inc, the content of which is incorporated herein by reference. An embodiment of the invention can have a generally similar structure to that of an UltraSPARC™ processor as described with reference to FIGS. 3 to 8, with a modified memory management unit as described with reference to FIGS. 9 and 10. However, it should be appreciated that the invention could equally be implemented in processors having other structures.

FIG. 3 gives an overview of an UltraSPARC™ processor, which is a high-performance, highly integrated superscalar processor implementing a 64-bit architecture. The processor pipeline is able to execute up to four instructions in parallel. A Prefetch and Dispatch Unit (PDU) 230 fetches instructions before they are actually needed in the pipeline, so the execution units do not starve for instructions. Prefetched instructions are stored in the Instruction Buffer 232 until they are sent to the rest of the pipeline. An instruction cache (I-cache) 233 is a 16 Kbyte two-way set associative cache with 32 byte blocks.

An Integer Execution Unit (IEU) 234 includes two arithmetic logic units (ALUs), a multi-cycle integer multiplier, a multi-cycle integer divider, eight register windows, four sets of global registers (normal, alternate, MMU, and interrupt globals) and trap registers.

A Floating-Point Unit (FPU) 236 is partitioned into separate execution units, which allow two floating-point instructions to be issued and executed per cycle. Source and result data are stored in a 32-entry Floating-Point (FP) register file (FP Reg) 238. FP Multiply 240, FP Add 242 and FP Divide 244, are all catered for. A Graphics Unit (GRU) 245 provides a comprehensive set of graphics instructions.

The Memory Management Unit (MMU) 228 provides mapping between a 44-bit virtual address and a 41-bit physical address. This is accomplished through a 64-entry instructions translation look-aside buffer (iTLB) 246 for instructions and a 64-entry data translation look-aside buffer (dTLB) 248 for data under the control of MMU control logic 250. Both TLBs are fully associative. The control logic 250 also provides hardware support for a software-based TLB miss strategy. A separate set of global registers 252 is available to process MMU traps.

A Load/Store Unit (LSU) 254 is responsible for generating the virtual address of all loads and stores for accessing a data cache (D-Cache) 256, for decoupling load misses from the pipeline through a load buffer 258, and for decoupling stores through a store buffer 259.

An External Cache Unit (ECU) 260 handles I-Cache 33 and D-Cache 56 misses efficiently. The ECU 260 can handle one access per cycle to an External Cache (E-Cache) 262. The ECU 260 provides overlap processing during load and store misses. For instance, stores that hit the E-Cache 262 can proceed while a load miss is being processed. The ECU 260 can process reads and writes and also handle snoops. Block loads and block stores, which load/store a 64-byte line of data from memory to the floating-point register file, are also processed by the ECU 260 to provide high transfer bandwidth without polluting the E-Cache 262.

A Memory Interface Unit (MIU) 264 handles all transactions to the system controller, for example, external cache misses, interrupts, snoops, writebacks, and so on.

Figure 4:
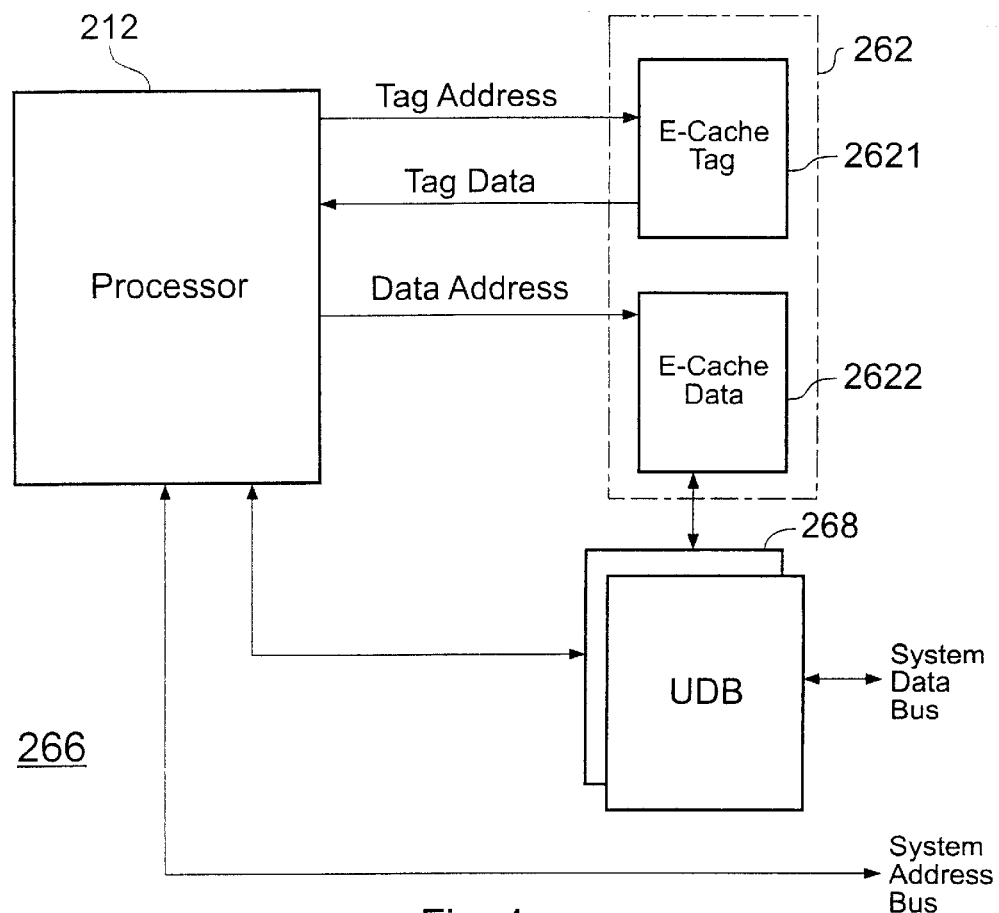
FIG. 4 is a schematic overview of a subsystem including the processor of FIG. 3.

FIG. 4 is a schematic overview of the UltraSPARC™ processor subsystem 266, which comprises the UltraSPARC™ processor 212, synchronous SRAM components for E-Cache tags and data 621 and 622, and two UltraSPARC™ data buffer (UDB) 268 chips. Typically, the processor 212 will be integrated in a single integrated circuit. The UDBs 268 isolate the E-Cache 262 from the system, provide data buffers for incoming and outgoing system transactions, and provide error correction code (ECC) generation and checking.

Figure 5:
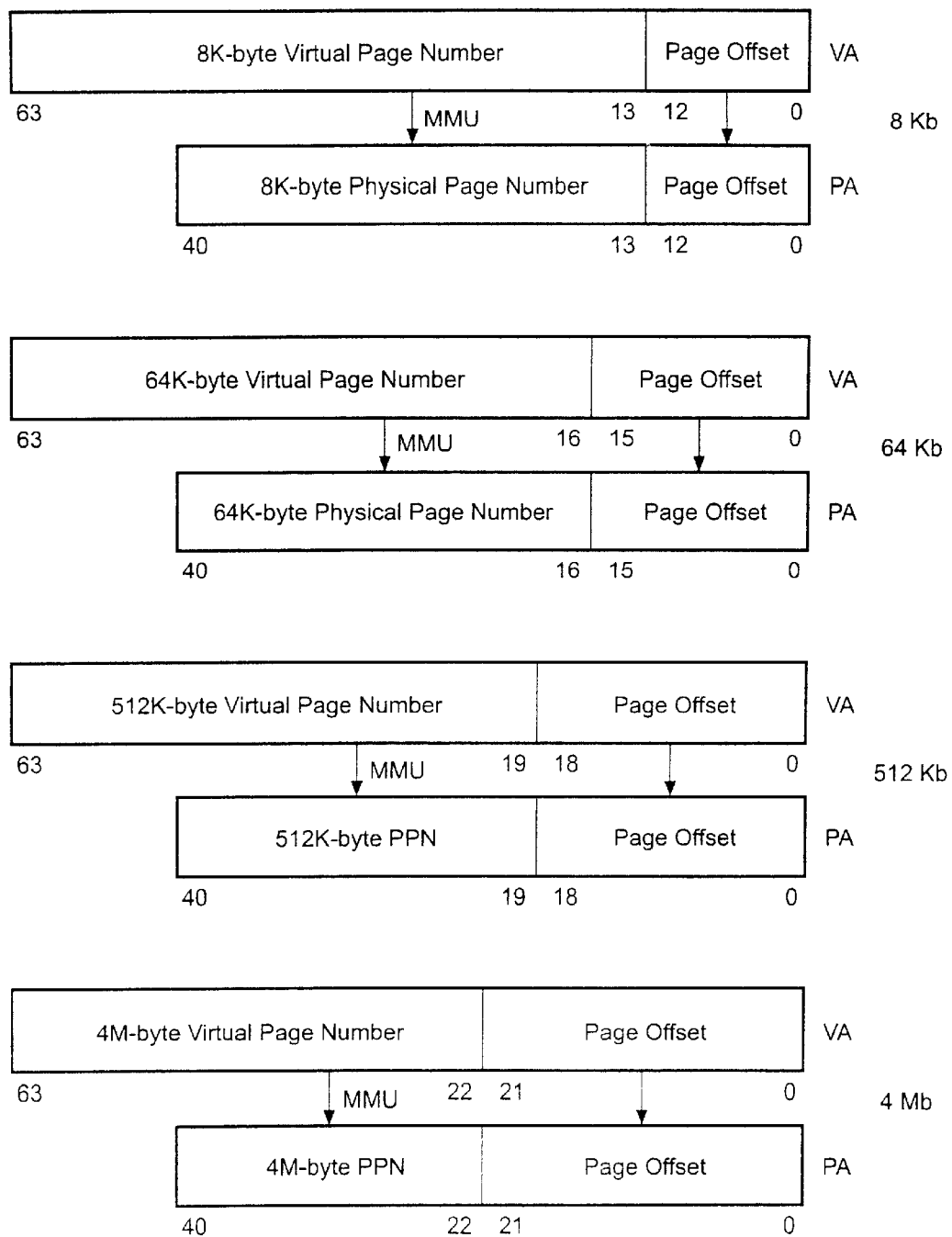
FIG. 5 illustrates virtual to physical address translation for the processor of FIG. 3.

There now follows a description of the Memory Management Unit (MMU) 228 as it is seen by operating system software. In this example, a 44-bit virtual address space is supported with 41 bits of physical address. During each processor cycle the MMU 228 provides one instruction and one data virtual-to-physical address translation. In each translation, the virtual page number is replaced by a physical page number, which is concatenated with the page offset to form the full physical address, as illustrated in FIG. 5 for each of four page sizes, namely 8 Kb, 64 Kb, 512 Kb, and 4 Mb. It should be noted that this Figure shows a full 64-bit virtual address, even though only 44 bits of Virtual Address (VA) are supported, as mentioned above.

Figure 6:
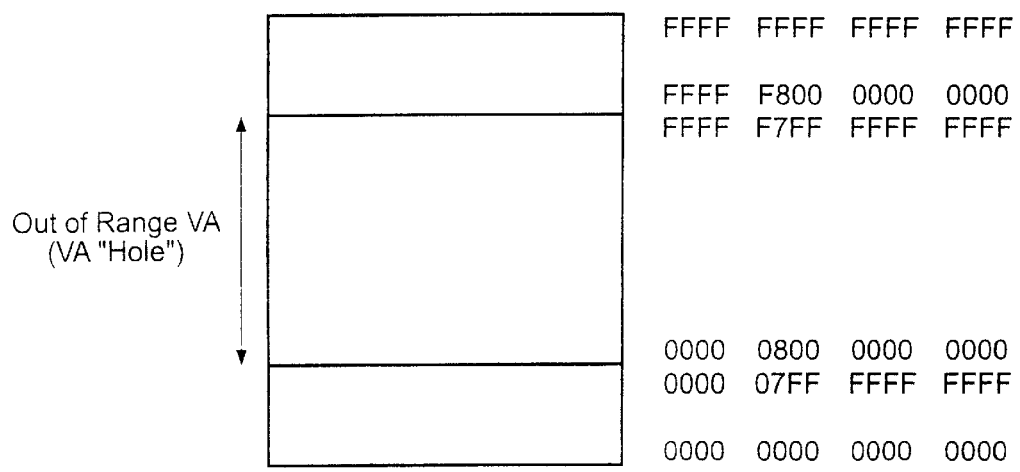
FIG. 6 illustrates an example of the relationship between virtual and physical address space for the processor of FIG. 3.

44-bit virtual address space is implemented in two equal halves at the extreme lower and upper portions of the full 64-bit virtual address space. Virtual addresses between 0000 0800 0000 0000$_{16}$ and FFFF F7FF FFFF FFFF$_{16}$, inclusive, are termed "out of range" and are illegal for the UltraSPARC™ virtual address space. In other words, virtual address bits VA<63:44> must be either all zeros or all ones. FIG. 6 illustrates the UltraSPARC™ virtual address space.

Figure 7:
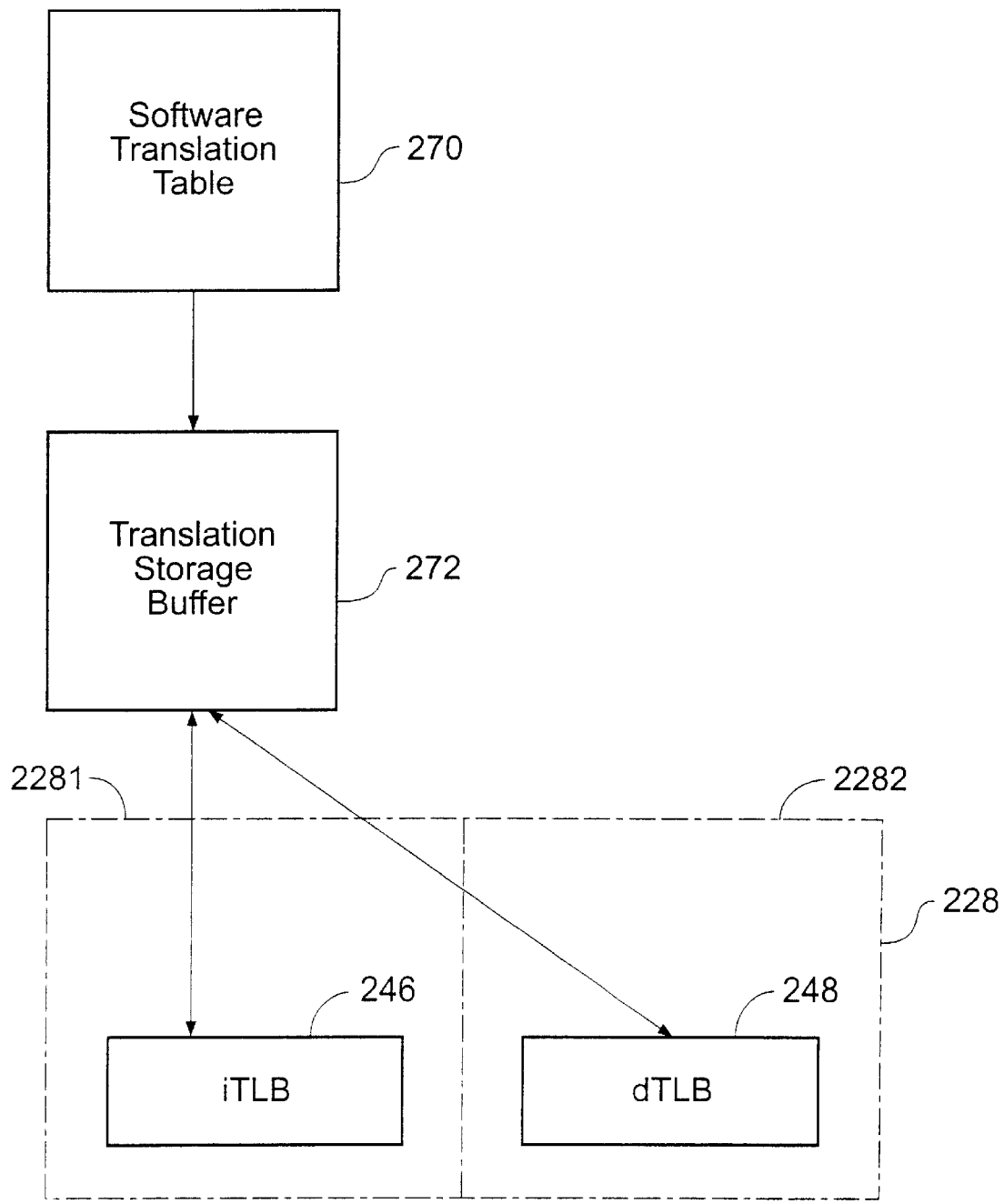
FIG. 7 is a schematic block diagram illustrating a software view of an example of the memory management unit of the processor of FIG. 3.

FIG. 7 is a block diagram illustrating the software view of the MMU 228. The operating system maintains translation information in a data structure called the Software Translation Table (STT) 270. The MMU 228 is effectively divided into an instruction MMU (I-MMU) 2281 and a data MMU (D-MMU) 2282. The I-MMU 2281 includes the hardware instructions Translation Lookaside Buffer (iTLB) 246 and the D-MMU 2282 includes the hardware data Translation Lookaside Buffer (dTLB) 248. These TLBs 246 and 248 act as independent caches of the Software Translation Table 270, providing one-cycle translation for the more frequently accessed virtual pages.

The STT 270, which is kept in memory, is typically large and complex compared to the relatively small hardware TLBs 246 and 248. A Translation Storage Buffer (TSB) 272, which acts like a direct-mapped cache, provides an interface between the STT 270 and the TLBs 246 and 248. The TSB 272 can be shared by all processes running on a processor, or it can be process specific.

When performing an address translation, a "TLB hit" occurs when a desired translation is present in the MMU's on-chip TLBs 246/248. A "TLB miss" occurs when a desired translation is not present in the MMU's on-chip TLBs 246/248. On a TLB miss the MMU 228 immediately traps to software for TLB miss processing. A software TLB miss handler has the option of filling the TLB by any means available, but it is likely to take advantage of TLB miss hardware support features provided by the MMU control logic 250, since the TLB miss handler is time critical code.

There now follows more information on the UltraSPARC™ Memory Management Unit (MMU) 228.

Figure 8:
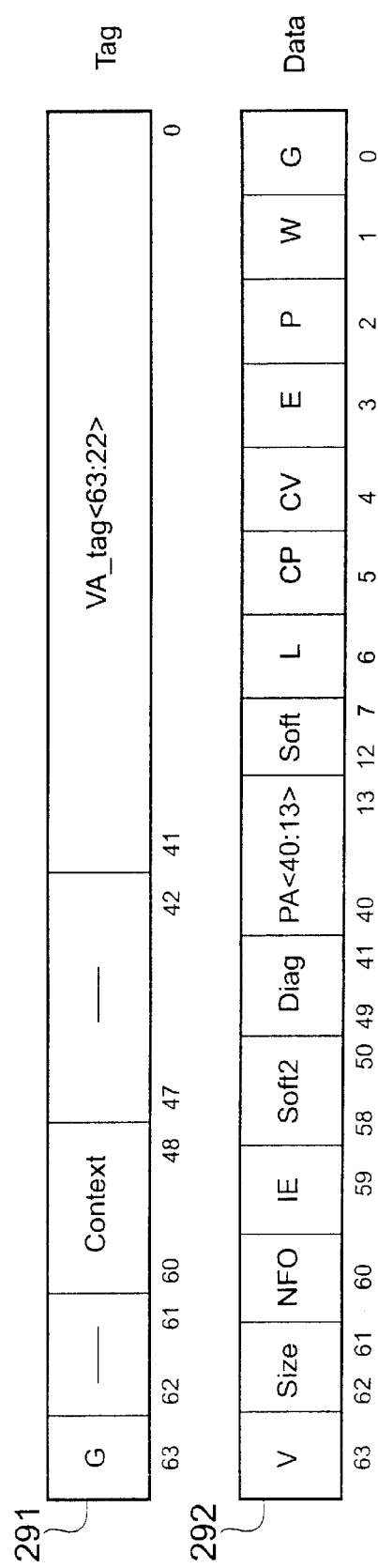
FIG. 8 illustrates a translation table entry for the memory management unit of FIG. 7 for the known processor of FIG. 3.

An example of an UltraSPARC™ Translation Table Entry (TTE) of the TSB 272 is shown in FIG. 8. This provides a translation entry that holds information for a single page mapping. The TTE is broken into two 64-bit words 291 and 292, representing the tag and data of the translation. Just as in a hardware cache, the tag is used to determine whether there is a hit in the TSB 272. If there is a hit, the data is fetched by software. The functions of fields of the tag and data words are described below.

Tag Word 291
    G—This is a Global bit. If the Global bit is set, the Context field of the TTE is ignored during hit detection. This allows any page to be shared among all (user or supervisor) contexts running in the same processor. The Global bit is duplicated in the TTE tag and data to optimize the software miss handler.
    Context—This is a 13-bit context identifier associated with the TTE.
    VA-tag<63:22>—The Virtual Address tag is the virtual page number.

Data Word 292
    V—This is a Valid bit. If the Valid bit is set, the remaining fields of the TTE are meaningful.
    Size—This is the page size for this entry.
    NFO—This is No-Fault-Only bit. If this bit is set, selected specific loads are translated, but all other accesses will trap with a data$_{13}$ access_exception trap.

IE—This is an Invert Endianness bit. If this bit is set, accesses to the associated page are processed with inverse endianness from what is specified by the instruction (big-for-little and little-for-big).

Soft<5:0>, Soft2<8:0>—These are software-defined fields provided for use by the operating system. The Soft and Soft2 fields may be written with any value.

Diag—This is a field used by diagnostics to access the redundant information held in the TLB structure. Diag<0>=Used bit, Diag<3:1>=RAM size bits, Diag<6:4>=CAM size bits.

PA<40:13>—This is the physical page number. Page offset bits for larger page sizes in the TTE (PA<15:13>, PA<18:13>, and PA<21:13> for 64 Kb, 512 Kb, and 4 Mb pages, respectively) are stored in the TLB and returned for a Data Access read, but are ignored during normal translation.

L—This is a Lock bit. If this bit is set, the TTE entry will be "locked down" when it is loaded into the TLB; that is, if this entry is valid, it will not be replaced by the automatic replacement algorithm invoked by an ASI store to the Data-In register.

CP, CV—These form cacheable-in-physically-indexed-cache and cacheable-in-virtually-indexed cache bits to determine the placement of data in UltraSPARC™ caches. The MMU does not operate on the cacheable bits, but merely passes them through to the cache subsystem.

E—This is a Side-effect bit. If this bit is set, speculative loads and FLUSHes will trap for addresses within the page, noncacheable memory accesses other than block loads and stores are strongly ordered against other E-bit accesses, and noncacheable stores are not merged.

P—This is a Privileged bit. If this bit is set, only the supervisor can access the page mapped by the TTE. If the P bit is set and an access to the page is attempted when PSTATE.PRIV=0, the MMU will signal an instruction_access_exception or data_access_exception trap (FT=$1_{16}$).

W—This is a Writable bit. If the W bit is set, the page mapped by this TTE has write permission granted. Otherwise, write permission is not granted and the MMU will cause a data_access_protection trap if a write is attempted. The W-bit in the I-MMU is read as zero and ignored when written.

G—This is identical to the Global bit in the TTE tag word. The Global bit in the TTE tag word is used for the TSB hit comparison, while the Global bit in the TTE data word facilitates the loading of a TLB entry.

All internal MMU registers, including the TTEs of the TSB 272, can be accessed directly by the CPU 224 using so-called Address Space Indicators (ASIs). ASIs can be allocated to specific registers internal to the MMU. Further details of ASIs and ASI operations can be found, for example, in the UltraSPARC™ User's Manual, Section 6.9, on pages 55 to 68, as available at http://www.sun.com/microelectronics/manuals/ultrasparc/802-7220-02.pdf The above description of the UltraSPARC™ processor represents an example of a prior art processor. In the following, the application of an embodiment of the invention in the context of such a processor is to be described, it being understood that the invention can equally be applied to processors of alternative designs and configurations.

Figures 9, 9A:
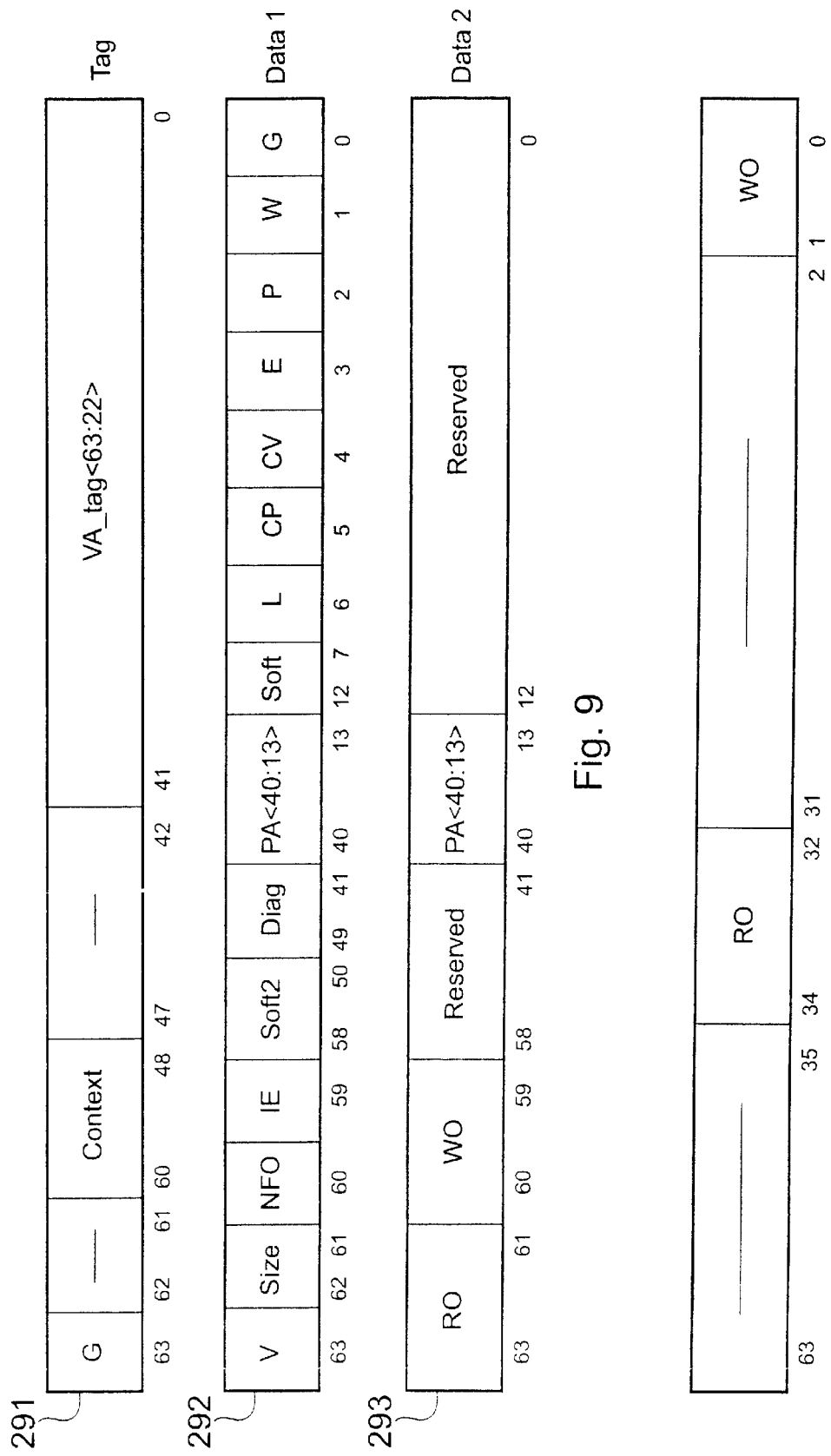
FIG. 9 illustrates a translation table entry for a memory management unit, and FIG. 9A an option register, of an embodiment of the invention.

In an embodiment of the invention, the MMU 28 is modified to provide a TSB 272 with TTEs as shown in FIG. 9. By comparing FIGS. 8 and 9, it can be seen that this embodiment of the invention provides a translation entry that holds information for two page mappings for a single virtual page address. The TTE of FIG. 9 includes three 64-bit words 291, 291 and 293, the first being a tag word as shown in FIG. 8, the second being a first data word and the third an extension word whereby two physical page addresses are provided. The functions of the fields of the tag word 291 and the first data word 292 are as described with reference to FIG. 8. The functions of the fields of the second data word 293 are as follows and provide options on a per translation basis:

RO—This is a read option field that specifies options for different types of read operations. An example of the possible read options and read option codes, where the main memory 216 is identified as "primary" and the backup memory 217 is identified as "secondary", are:
000—Read neither
001—Read primary
010—Read secondary
011—Read both (and use the secondary data if the primary data is faulty)
111—Read both (compare and trap if different)

WO—This is a write option field that specifies options for different types of write operations. An example of the possible write options and write option codes are:
00—Write to neither
01—Write to primary
10—Write to secondary
11—Write to both PA<40:13>—This is the second physical page number. Page offset bits for larger page sizes in the TTE (PA<15:13>, PA<18:13>, and PA<21:13> for 64 Kb, 512 Kb, and 4 Mb pages, respectively) are stored in the TLB and returned for a Data Access read, but are ignored during normal translation.

Alternatively, to support the read and write options described above in the context of a global I- or D-MMU configuration such as is described with reference to FIG. 3, an options register is provided that is accessed by a specific ASI (e.g. ASI 0x60 and 0x61) for each of the I-MMU and D-MMU respectively. The option register can have the format illustrated in FIG. 9A.

In this alternative embodiment of the invention as shown in FIG. 1, the first data word 292 of each TTE (specifically the physical page number PA<40:13> of the first data word 292) can be used to address the main memory 216 and the second data word 293 of each TTE (specifically the physical page number PA<40:13> of the second data word 293) can be used to address the backup memory 217. Using the options field in an option register (see FIG. 9A) in the memory management unit accessible via respective ASIs, different options can be deemed to be active on a global basis in any particular situation (for example whether one or both of the first and second data words is to be used for a given type of instruction and/or in response to an instruction from a given principal (e.g., a user or program)). Different options can be effected for different types of accesses (e.g., read and write accesses).

Alternatively, one or more of the unused bits in each data word could also be used as option validity bits to indicate whether a particular translations is to be active in any particular situation.

The dual physical address translations can be put to good effect in an embodiment of the invention as will be described in the following. In that embodiment, writes cause data to be stored using both physical addresses and reads cause data to be read using one physical address in normal operation.

Figure 10:
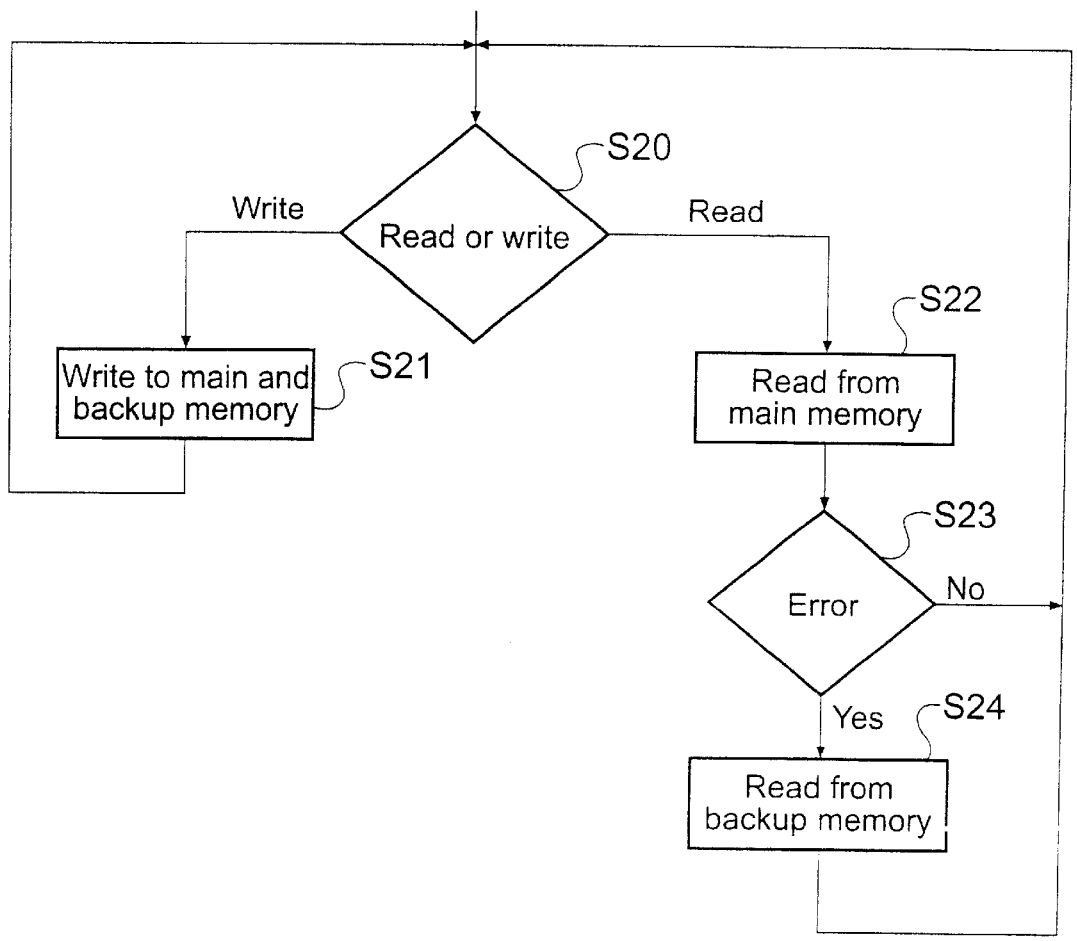
FIG. 10 is a flow diagram illustrating the operation of an embodiment of the invention.

FIG. 10 is a flow diagram illustrating the operation of the embodiment of the invention described with reference to FIG. 1 and having a memory management unit 228 with dual physical address translations as described with reference to FIG. 9.

In step S20, the memory management unit is operable to determine whether a memory access operation is a write or a read operation.

If it is a memory write operation, then in step S21 the MMU 228 is operable to cause a write operation to be effected using the physical page addresses in both of the data words 292 and 293, whereby the data to be written is written to both the main memory 216 and to the backup memory 217 and the appropriate addresses.

If it is a read operation, then in step S22, the MMU 228 is operable to cause the read to be effected from the main memory 216 using the physical page address in the first data word 292 for the appropriate TTE only.

If, on reading the information from the main memory 216, a parity or any other fault is detected in step S23, then the MMU 228 is operable in step S24 to read the data from the corresponding location in the backup memory as indicated by the physical page address in the second data word of 293 for the appropriate TTE.

It can be seen, therefore, that the second memory 217 can be used as a back up for the first memory 216 in the event that the first memory 216 develops a fault, or data read from the first memory 216 is found to contain parity or other errors on being read. In the event of an error, the second physical address in the second data word(s) 293 is used to read data corresponding to the data of the first memory found to be erroneous.

Although the second memory 217 is shown connected to the processor bus 214, this need not be the case. It could, for example, be connected to the IO bus 220, or indeed could be connected to another processor interconnected with the first processor.

In the above example, each write results in data being stored in both memories. However, in another embodiment, the second memory could be used only in specific instances, for example when replication of the first memory is required.

For example, the memory management unit can then be operable in response to a specific replication instruction for a processor address. In response to such an instruction, the memory management unit can be operable, for example, to read from a memory location in the first memory identified by the first translation for the processor address and to write to a memory location in the second memory identified by the second translation for the processor address.

As suggested above, a number of options can be envisaged for controlling the behavior of a memory management unit given the presence of dual translations and the encoding of the read options and the write options as in the RO and WO fields respectively of the second data word shown in FIG. 9.

In the case of a read access the options can include:
  read the primary memory;
  read the secondary memory;
  read the secondary memory if the primary memory contains an unrecoverable error (and thereby avoid a trap being taken);
  read both memories and take a trap if they are different; and
  read nether and fake the result.
In the case of a write access the options could include:
  write to the primary memory;
  write to the secondary memory;
  write to both memories; and
  write to neither memory and fake the result.

It should be apparent from these examples that although the first and second 216 and 217 are described as primary and secondary memories, respectively, they need not be viewed in this way. For example, they could be considered to be equivalent memories, especially in a situation where both are addressed and then a special action is effected (for example a trap is taken) in the event that the results of the accesses do not compare.

A further embodiment will now be described with reference to FIGS. 11–17. This embodiment is based on a fault tolerant computer system that includes multiple processing sets and a bridge of the type described in WO 99/66402 to include a memory management unit in accordance with the invention and duplicated memories.

Figure 11:
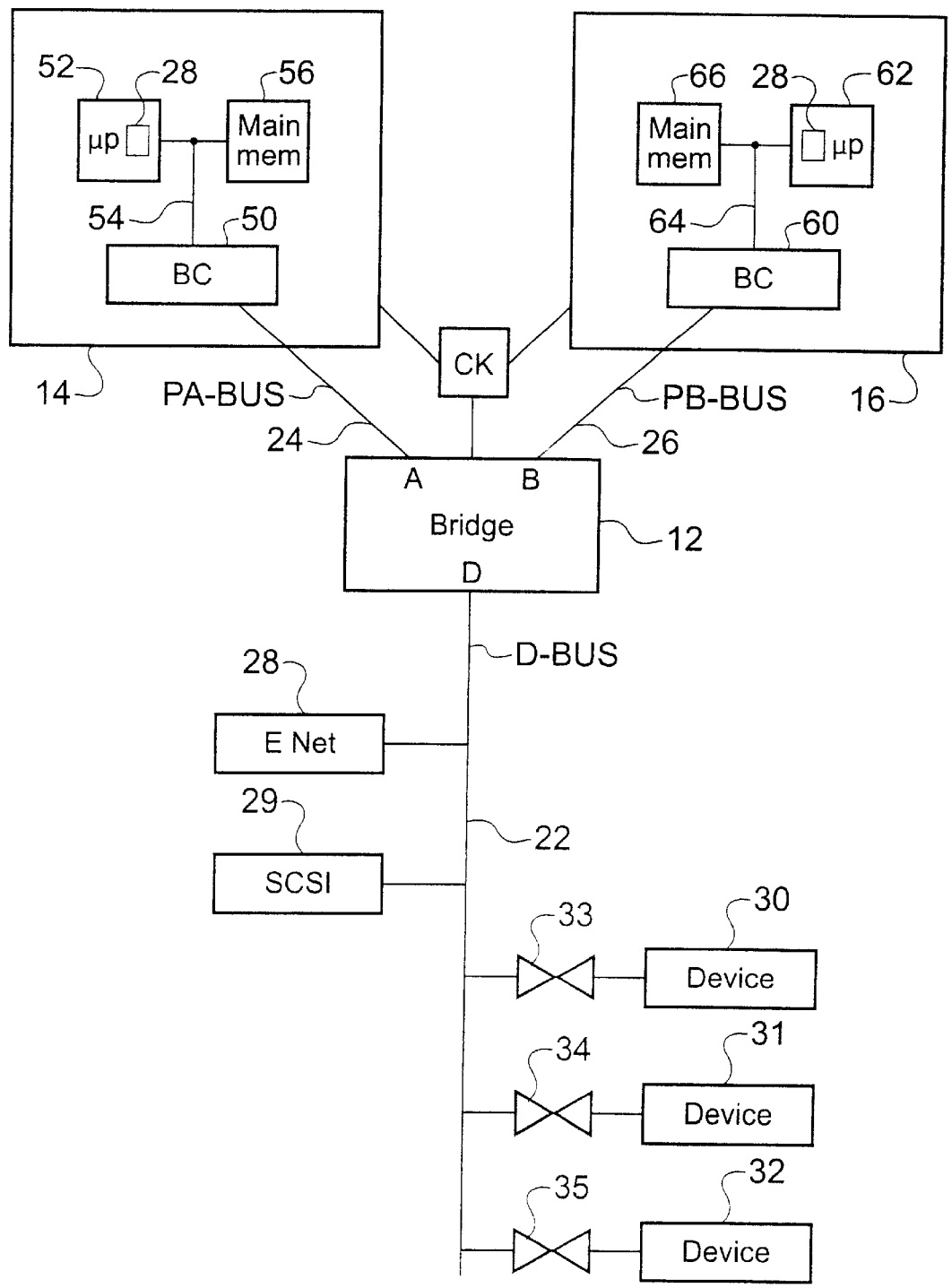
FIG. 11 is a schematic overview of another embodiment of the invention.

FIG. 11 is a schematic overview of a fault tolerant computing system 10 comprising a plurality of CPUsets (processing sets) 14 and 16 and a bridge 12. As shown in FIG. 11, there are two processing sets 14 and 16, although in other examples there may be three or more processing sets. The bridge 12 forms an interface between the processing sets and IO devices such as devices 28, 29, 30, 31 and 32. In this document, the term "processing set" is used to denote a group of one or more processors, possibly including memory, which output and receive common outputs and inputs. It should be noted that the alternative term mentioned above, "CPUset", could be used instead, and that these terms could be used interchangeably throughout this document. Also, it should be noted that the term "bridge" is used to denote any device, apparatus or arrangement suitable for interconnecting two or more buses of the same or different types.

The first processing set 14 is connected to the bridge 12 via a first processing set IO bus (PA bus) 24, in the present instance a Peripheral Component Interconnect (PCI) bus. The second processing set 16 is connected to the bridge 12 via a second processing set IO bus (PB bus) 26 of the same type as the PA bus 24 (i.e. here a PCI bus). The IO devices are connected to the bridge 12 via a device IO bus (D bus) 22, in the present instance also a PCI bus.

Although, in the particular example described, the buses 22, 24 and 26 are all PCI buses, this is merely by way of example, and in other examples other bus protocols may be used and the D-bus 22 may have a different protocol from that of the PA bus and the PB bus (P buses) 24 and 26.

The processing sets 14 and 16 and the bridge 12 are operable in synchronism under the control of a common clock 20, which is connected thereto by clock signal lines 21.

Some of the devices including an Ethernet (E-NET) interface 28 and a Small Computer System Interface (SCSI) interface 29 are permanently connected to the device bus 22, but other IO devices such as IO devices 30, 31 and 32 can be hot insertable into individual switched slots 33, 34 and 35. Dynamic field effect transistor (FET) switching can be provided for the slots 33, 34 and 35 to enable hot insertability of the devices such as devices 30, 31 and 32. The provision of the FETs enables an increase in the length of the D bus 22 as only those devices that are active are switched on, reducing the effective total bus length. It will be appreciated that the number of IO devices that may be connected to the D bus 22, and the number of slots provided for them, can be adjusted according to a particular implementation in accordance with specific design requirements.

In this example, the first processing set 14 includes a processor 52, for example a processor as described with reference to FIG. 3, and an associated main memory 56 connected via a processor bus 54 to a processing set bus controller 50. The processing set bus controller 50 provides an interface between the processor bus 54 and the processing set IO bus(es) (P bus(es)) 24 for connection to the bridge(s) 12.

The second processing set 16 also includes a processor 62, for example a processor as described with reference to FIG. 3, and an associated main memory 66 connected via a processor bus 64 to a processing set bus controller 60. The processing set bus controller 60 provides an interface between the processor bus 64 and the processing set IO bus(es) (P bus(es)) 24 for connection to the bridge(s) 12.

Each of the processors 52 and 62 includes a memory management unit 28 that converts between addresses generated in processor space (hereinafter processor addresses) by the processor connected thereto and addresses in memory space (hereinafter memory addresses). Each MMU 28 is configured to provide TTE entries with dual TTE data words 292 and 293 as described with reference to FIG. 9. For each MMU 28, the first of those TTE data words 292 contains physical addresses for the main memory of the processing set that includes that MMU 28, and the second of the TTE data words 293 contains equivalent physical addresses the main memory of the other processing set. The reason for this will become clear with reference to the description that is given later of FIG. 14.

Figure 12:
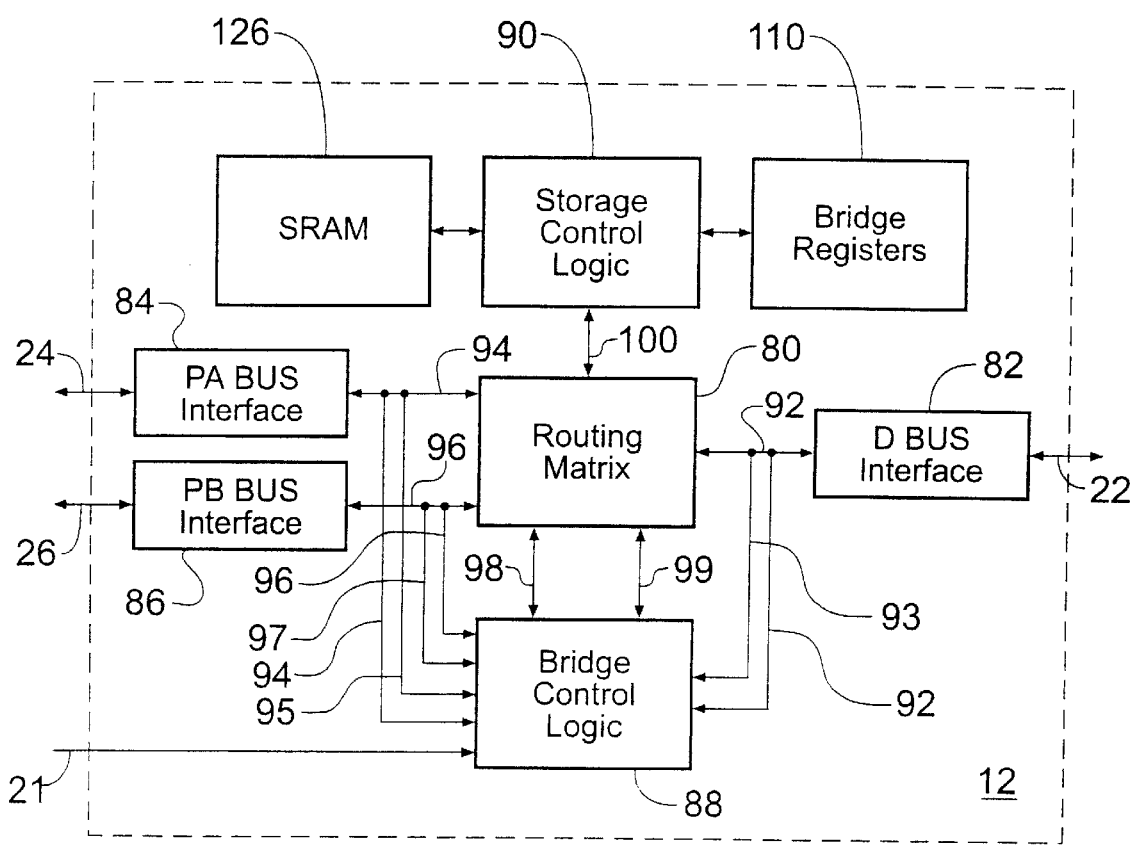
FIG. 12 is a schematic block diagram of an example of a bridge for the system of FIG. 11.

FIG. 12 is a schematic functional overview of the bridge 12 of FIG. 11. First and second processing set IO bus interfaces, PA bus interface 84 and PB bus interface 86, are connected to the PA and PB buses 24 and 26, respectively. A device IO bus interface, D bus interface 82, is connected to the D bus 22. It should be noted that the PA, PB and D bus interfaces need not be configured as separate elements but could be incorporated in other elements of the bridge. Accordingly, within the context of this document, where a reference is made to a bus interface, this does not require the presence of a specific separate component, but rather the capability of the bridge to connect to the bus concerned, for example by means of physical or logical bridge connections for the lines of the buses concerned.

Routing (hereinafter termed a routing matrix) 80 is connected via a first internal path 94 to the PA bus interface 84 and via a second internal path 96 to the PB bus interface 86. The routing matrix 80 is further connected via a third internal path 92 to the D bus interface 82. The routing matrix 80 is thereby able to provide IO bus transaction routing in both directions between the PA and PB bus interfaces 84 and 86. It is also able to provide routing in both directions between one or both of the PA and PB bus interfaces and the D bus interface 82. The routing matrix 80 is connected via a further internal path 100 to storage control logic 90. The storage control logic 90 controls access to bridge registers 110 and to a random access memory (SRAM) 126. The routing matrix 80 is therefore also operable to provide routing in both directions between the PA, PB and D bus interfaces 84, 86 and 82 and the storage control logic 90. The routing matrix 80 is controlled by bridge control logic 88 over control paths 98 and 99. The bridge control logic 88 is responsive to control signals, data and addresses on internal paths 93, 95 and 97, and also to clock signals on the clock line(s) 21.

In the present example, each of the P buses (PA bus 24 and PB bus 26) operates under a PCI protocol. The processing set bus controllers 50 (see FIG. 3) also operate under the PCI protocol. Accordingly, the PA and PB bus interfaces 84 and 86 each provide all the functionality required for a compatible interface providing both master and slave operation for data transferred to and from the D bus 22 or internal memories and registers of the bridge in the storage subsystem 90. The bus interfaces 84 and 86 can provide diagnostic information to internal bridge status registers in the storage subsystem 90 on transition of the bridge to an error state (EState) or on detection of an IO error.

The device bus interface 82 performs all the functionality required for a PCI compliant master and slave interface for transferring data to and from one of the PA and PB buses 84 and 86. The D bus 82 is operable during direct memory access (DMA) transfers to provide diagnostic information to internal status registers in the storage subsystem 90 of the bridge on transition to an EState or on detection of an IO error.

The bridge control logic 88 performs functions of controlling the bridge in various modes of operation and is responsive to timing signals on line 21 from the clock source 20A shown in FIG. 12. The bridge(s) 12 are operable in different modes including so-called combined and split modes. In a combined mode, the bridge control logic 88 enables the bridge 12 to route addresses and data between the processing sets 14 and 16 (via the PA and PB buses 24 and 26, respectively) and the devices (via the D bus 22). In this combined mode, IO cycles generated by the processing sets 14 and 16 are compared by the bridge control logic 88 to ensure that both processing sets are operating correctly. On detecting a comparison failure, the bridge control logic forces the bridge 12 into an error-limiting mode (EState) in which device IO is prevented and diagnostic information is collected. In a split mode, the bridge control logic 88 enables the bridge 12 to route and arbitrate addresses and data from one of the processing sets 14 and 16 onto the D bus 22 and/or onto the other one of the processing sets 16 and 14, respectively. In this mode of operation, the processing sets 14 and 16 are not synchronized and no IO comparisons are made. DMA operations are also permitted in both modes.

Further details of an example of a construction of the bridge 12, which details are not needed for an understanding of the present invention, can be found in WO 99/66402.

Figure 13:
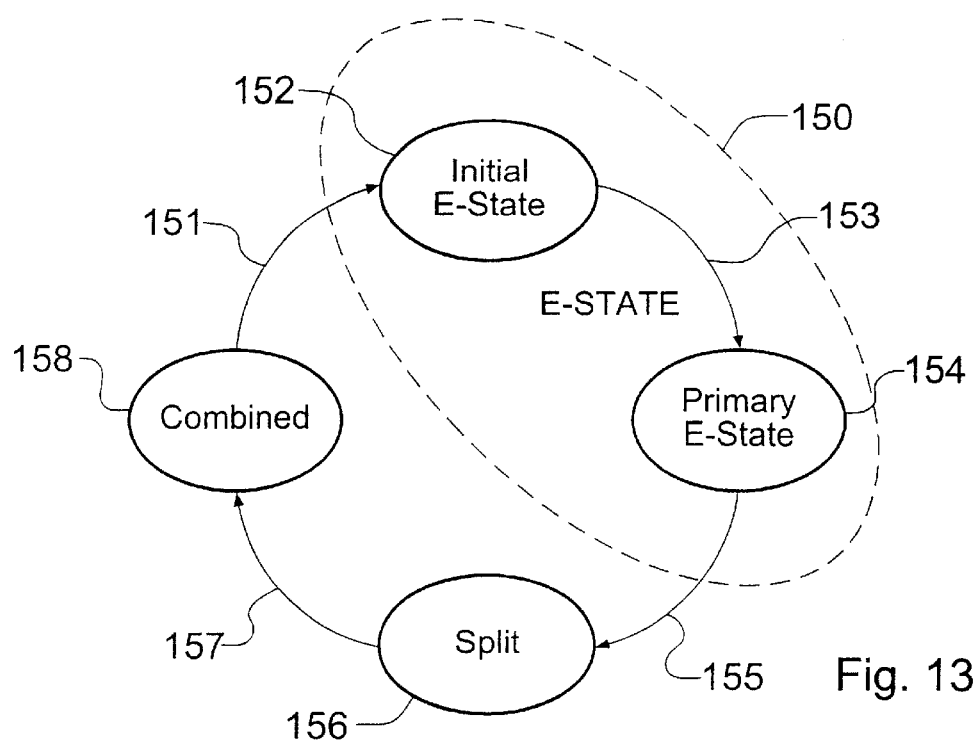
FIG. 13 is a state diagram illustrating operational states of the bridge of FIG. 12.

FIG. 13 is a transition diagram illustrating various operating modes of the bridge. FIG. 13 illustrates the bridge operation divided into three basic modes, namely an error state (EState) mode 150, a split state mode 156 and a combined state mode 158. The EState mode 150 can be further divided into 2 states.

After initial resetting on powering up the bridge 12, or following an out-of sync event, the bridge is in this initial EState 152. In this state, all writes are stored in registers in the bridge and reads from the internal bridge registers are allowed, and all other reads are treated as errors (i.e. they are aborted). In this state, the individual processing sets 14 and 16 perform evaluations for determining a restart time. Each processing set 14 and 16 will determine its own restart timer timing. The timer setting depends on a "blame" factor for the transition to the EState. A processing set that determines that it is likely to have caused the error sets a long time for the timer. A processing set that thinks it unlikely to have caused the error sets a short time for the timer. The first processing set 14 and 16 that times out, becomes a primary processing set. Accordingly, when this is determined, the bridge moves (153) to the primary EState 154.

When either processing set 14/16 has become the primary processing set, the bridge is then operating in the primary EState 154. This state allows the primary processing set to write to bridge registers. Other writes are no longer stored in the posted write buffer, but are simply lost. Device bus reads are still aborted in the primary EState 154.

Once the EState condition is removed, the bridge then moves (155) to the split state 156. In the split state 156, access to the device bus 22 is controlled by data in the bridge registers with access to the bridge storage simply being arbitrated. The primary status of the processing sets 14 and 16 is ignored. Transition to a combined operation is achieved by means of a sync_reset (157). After issue of the sync_reset operation, the bridge is then operable in the combined state 158, whereby all read and write accesses on the D bus 22 and the PA and PB buses 24 and 26 are allowed. All such accesses on the PA and PB buses 24 and 26 are compared in the comparator 130. Detection of a mismatch between any read and write cycles (with an exception of specific dissimilar data IO cycles) cause a transition 151 to the EState 150. The various states described are controlled by the bridge controller 132.

The bridge control logic 88 monitors and compares IO operations on the PA and PB buses in the combined state 158 and, in response to a mismatched signal, notifies the bridge controller 132, whereby the bridge controller 132 causes the transition 151 to the error state 150. The IO operations can include all IO operations initiated by the processing sets, as well as DMA transfers in respect of DMA initiated by a device on the device bus.

As described above, after an initial reset, the system is in the initial EState 152. In this state, neither processing sets 14 or 16 can access the D bus 22 or the P bus 26 or 24 of the other processing set 16 or 14. The internal bridge registers 110 of the bridge are accessible, but are read only.

A system running in the combined mode 158 transitions to the EState 150 where there is a comparison failure detected in this bridge, or alternatively a comparison failure is detected in another bridge in a multi-bridge system as shown, for example, in FIG. 2. Also, transitions to an EState 150 can occur in other situations, for example in the case of a software-controlled event forming part of a self test operation.

On moving to the EState 150, an interrupt is signaled to all or a subset of the processors of the processing sets via an interrupt line 95. Following this, all IO cycles generated on a P bus 24 or 26 result in reads being returned with an exception and writes being recorded in the internal bridge registers.

Figure 14:
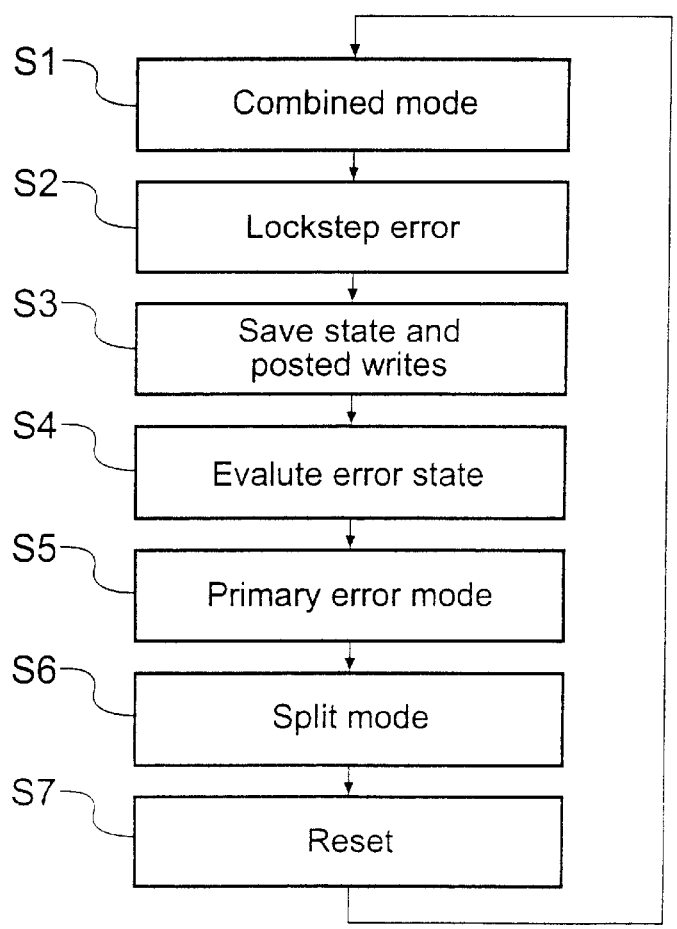
FIG. 14 is a flow diagram illustrating stages in the operation of the embodiment of FIG. 11.

FIG. 14 is a flow diagram illustrating a possible sequence of operating stages where lockstep errors are detected during a combined mode of operation.

Stage S1 represents the combined mode of operation where lockstep error checking is performed by the bridge control logic 88.

In Stage S2, a lockstep error is assumed to have been detected by the bridge control logic 88.

In Stage S3, the current state is saved in selected internal bridge registers 110 and posted writes are also saved in other internal bridge registers 110.

After saving the status and posted writes, at Stage S4 the individual processing sets independently seek to evaluate the error state and to determine whether one of the processing sets is faulty. This determination is made by the individual processors in an error state in which they individually read status from the control state and the internal bridge registers 110. During this error mode, the arbiter 134 arbitrates for access to the bridge 12.

In Stage S5, one of the processing sets 14 and 16 establishes itself as the primary processing set. This is determined by each of the processing sets identifying a time factor based on the estimated degree of responsibility for the error, whereby the first processing set to time out becomes the primary processing set. In Stage S5, the status is recovered for that processing set and is copied to the other processing set.

In Stage S6, the bridge is operable in a split mode. The primary processing set is able to access the posted write information from the internal bridge registers 110, and is able to copy the content of its main memory to the main memory of the other processing set.

To illustrate this, it is to be assumed that the first processing set 14 is determined to be the primary processing set. The processor 52 of the first processing set 14 uses the physical addresses in the first TTE data words 292 in the TTE entries in its MMU 28 to identify the read addresses in its own main memory 56. It also uses the physical addresses in the second TTE data words 293 in the TTE entries in its MMU 28 to identify the write addresses in the main memory 66 of the other processing set 14. In this way, reintegration software can use a combined instruction with a single virtual address to cause the read and write operation (copy operation) to be performed. For example, the memory management unit can then be operable in response to replication instructions from a processor to read from memory locations in its main memory and to write to memory locations in the corresponding backup memory identified by the first and second translations in the TTEs.

If, instead, the second processing set 16 were determined to be the primary processing set, the processor 62 of the second processing step would carry out equivalent functions. Thus, the processor 62 of the second processing set 16 would the physical addresses in the first TTE data words 292 in the TTE entries in its MMU 28 to identify the read addresses in its own main memory 66. It would also use the physical addresses in the second TTE data words 293 in the TTE entries in its MMU 28 to identify the write addresses in the main memory 56 of the other processing set 14.

If it is possible to re-establish an equivalent status for the first and second processing sets, then a reset is issued at Stage S7 to put the processing sets in the combined mode at Stage S1. However, it may not be possible to re-establish an equivalent state until a faulty processing set is replaced. Accordingly the system will stay in the Split mode of Stage S6 in order to continue operation based on a single processing set. After replacing the faulty processing set the system could then establish an equivalent state and move via Stage S7 to Stage S1.

Figure 15:
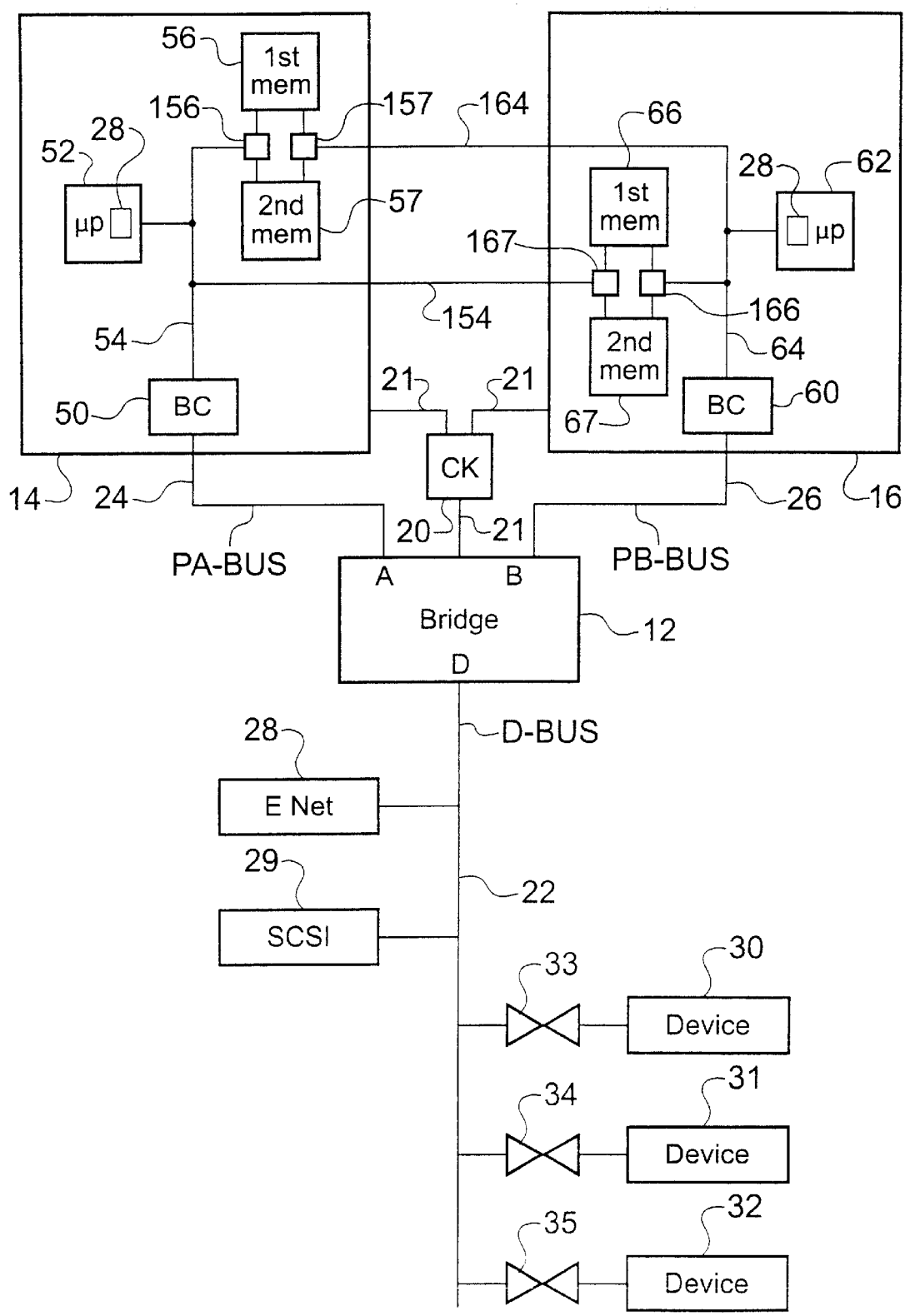
FIG. 15 is a schematic overview of another embodiment of the invention.

FIG. 15 illustrates a schematic overview of an alternative fault tolerant computing system 10 in accordance with the invention. This embodiment is similar to that of FIG. 11, and like elements will not be described again. In the embodiment of FIG. 15, however, the first processing set 14 includes first and second memories 56 and 57, one of which is selected as a main memory at any time through the operation of an interface 156. Also, the second processing set 16 includes first and second memories 66 and 67, one of which is selected as a main memory at any time through the operation of an interface 166. The interfaces 156 and 166 are under the control of whichever processing set was last determined to be a primary processing set during an initial or subsequent reintegration procedure.

A first interconnect bus 154 interconnects the processor bus 54 of the first processing set 14 to a selected one of the first and second memories 66, 67 of the second processing set 16 via an interface 167. The interface 167 is set to select the one of the memories 66 and 67 not selected as the main memory for the second processing set 16. A second interconnect bus 164 interconnects the processor bus 64 of the second processing set 16 to a selected one of the first and second memories 56, 57 of the first processing 14 set via an interface 157. The interface 157 is set to select the one of the memories 56 and 57 not selected as the main memory for the first processing set 14. The interfaces 157 and 167 are under the control of whichever processing set was last determined to be a primary processing set during an initial or subsequent reintegration procedure.

In normal lockstep operation, the processor of each processing set is operable to write to the memory currently selected as the main memory using the physical addresses in the first of the TTE data words 292 in response to a virtual address generated by the processor. It is also operable to write to the memory currently not selected as the main memory for the other processor using the physical addresses in the second of the TTE data words 292 in response to a virtual address generated by the processor. The addressing of the correct processor is achieved without compromising lockstep operation thanks to the states of the switching interfaces 156, 157, 166, 167.

Following the detection of a lockstep error, an attempt to reintegrate the processor state would not require copying of one memory to another, but merely requires the processing set determined to be the primary processing set to cause the switch state of the interfaces of the other processing set to be reversed.

Figure 16:
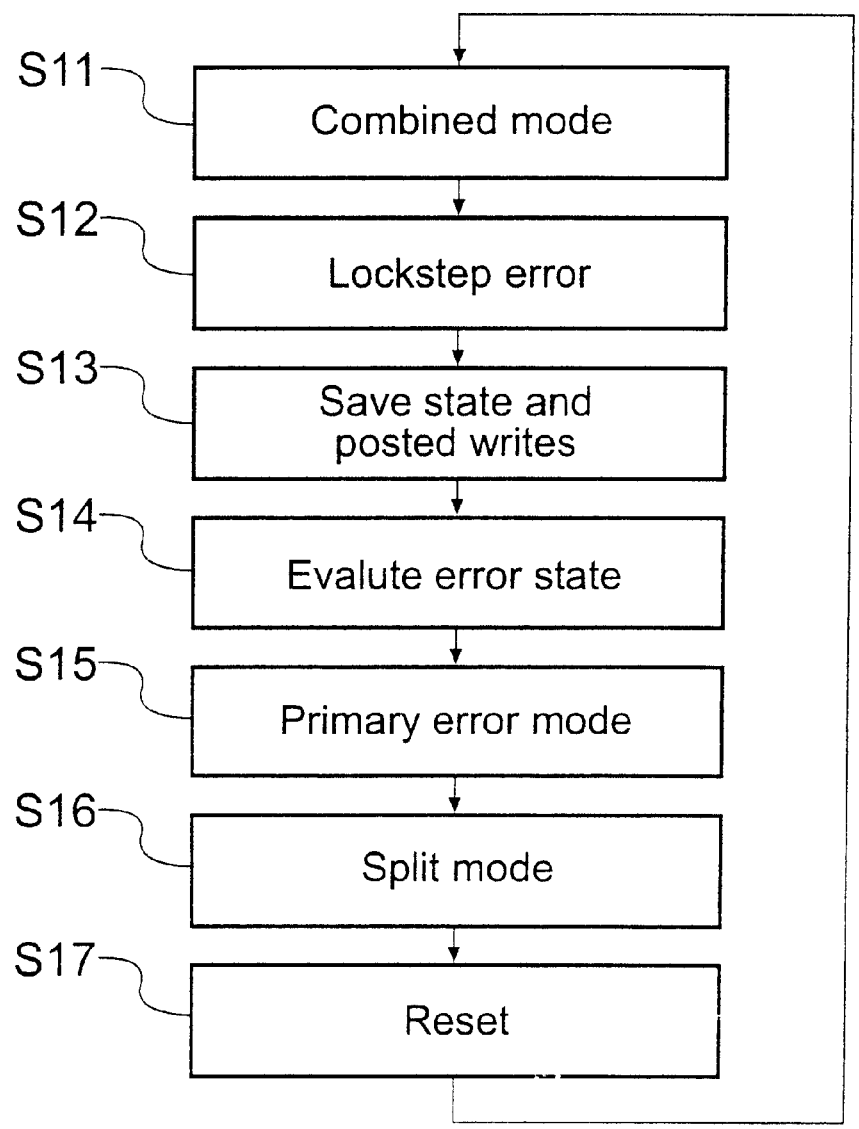
FIG. 16 is a flow diagram illustrating stages in the operation of the embodiment of FIG. 11.

Consider the following example of the operation of an example of the invention of FIG. 15 with reference to the flow diagram of FIG. 16. Although the stages follow the same sequence as in FIG. 14, the detail of the stages is different.

Stage S11 represents the combined, lockstep, mode of operation where lockstep error checking is performed by the bridge control logic 88. As an example, assume that during lockstep operation, the first memory 56 of the first processing set 14 is the main memory for the first processing set 14 as determined by the switch interface 156 and the second memory 67 of the second processing set 16 is the main memory for the second processing set 14 as determined by the switch interface 156. Then, the second memory 57 of the first processing set 14 is the backup (or mirror) memory for the second processing set 16 as determined by the switch interface 157 and the second memory 67 of the second processing set 16 is the backup memory (or mirror) for the first processing set 14 as determined by the switch interface 167. During normal lockstep operation, therefore, the processor of the first processing set is operable to write to the first memory 56, 66 of both processing sets and to read from its first memory 56. The processor of the second processing set is operable to write to the second memory 67, 57 of both processing sets and to read from its second memory 67.

In Stage S12, a lockstep error is assumed to have been detected by the bridge control logic 88.

In Stage S13, the current state is saved in selected internal bridge registers 110 and posted writes are also saved in other internal bridge registers 110.

After saving the status and posted writes, at Stage S14 the individual processing sets independently seek to evaluate the error state and to determine whether one of the processing sets is faulty. This determination is made by the individual processors in an error state in which they individually read status from the control state and the internal bridge registers 110. During this error mode, the arbiter 134 arbitrates for access to the bridge 12.

In Stage S15, one of the processing sets 14 and 16 establishes itself as the primary processing set. This is determined by each of the processing sets identifying a time factor based on the estimated degree of responsibility for the error, whereby the first processing set to time out becomes the primary processing set.

In Stage S16, the bridge is operable in a split mode. The primary processing set is able to access the posted write information from the internal bridge registers 110. The processing set determined to be the primary processing set then causes the switch state of the interfaces of the other processing set to be reversed, thereby reinstating an equivalent memory state in each of the processors.

To illustrate this, it is to be assumed that the first processing set 14 is determined to be the primary processing set. The processor 52 of the first processing set 14 is then operable to switch the interface 166 of the second processing set so that the first memory 66 of the second processing set 16 (which contained the same content as the first memory of the first processing set) becomes the main memory for the second processing set 14 and to switch the interface 167 of the second processing set so that the second memory 67 of the second processing set 16 becomes the backup memory for the first processing set 14.

The state of the backup memories can then be set to correspond to that of the main memories by copying one to the other. For example, the memory management unit can then be operable in response to replication instructions from a processor to read from memory locations in its main memory and to write to memory locations in the corresponding backup memory identified by the first and second translations in the TTEs.

Assuming that it is possible to re-establish an equivalent status for the first and second processing sets, then a reset is issued at Stage S17 to put the processing sets in the combined mode at Stage S11. However, it may not be possible to re-establish an equivalent state until a faulty processing set is replaced. In this case, the system will stay in the Split mode of Stage S16 in order to continue operation based on a single processing set. After replacing the faulty processing set the system could then establish an equivalent state and move via Stage S17 to Stage S11.

Figure 17:
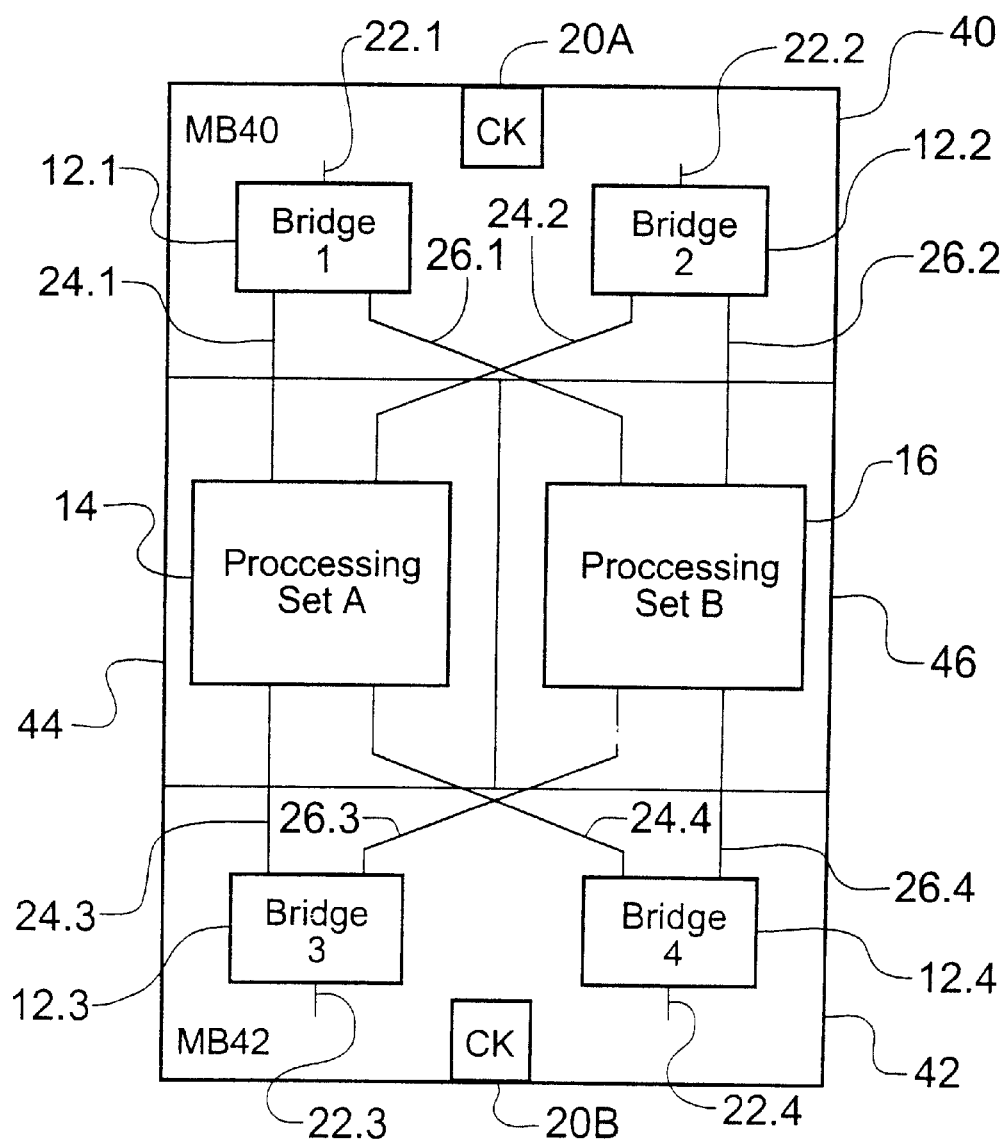
FIG. 17 illustrates a specific example of an implementation of an embodiment of the type shown in FIG. 11 or FIG. 15.

FIG. 17 is a schematic overview of a particular implementation of a fault tolerant computer employing a bridge structure of the type illustrated in FIG. 1. In FIG. 2, the fault tolerant computer system includes a plurality (here four) of bridges 12 on first and second IO motherboards (MB 40 and MB 42) order to increase the number of IO devices that may be connected and also to improve reliability and redundancy. Thus, in the example shown in FIG. 12, two processing sets 14 and 16 are each provided on a respective processing set board 44 and 46, with the processing set boards 44 and 46 'bridging' the IO motherboards MB 40 and MB 42. A first, master clock source 20A is mounted on the first motherboard 40 and a second, slave clock source 20B is mounted on the second motherboard 42. Clock signals are supplied to the processing set boards 44 and 46 via respective connections (not shown in FIG. 2).

First and second bridges 12.1 and 12.2 are mounted on the first IO motherboard 40. The first bridge 12.1 is connected to the processing sets 14 and 16 by P buses 24.1 and 26.1, respectively. Similarly, the second bridge 12.2 is connected to the processing sets 14 and 16 by P buses 24.2 and 26.2, respectively. The bridge 12.1 is connected to an IO databus (D bus) 22.1 and the bridge 12.2 is connected to an IO databus (D bus) 22.2.

Third and fourth bridges 12.3 and 12.4 are mounted on the second IO motherboard 42. The bridge 12.3 is connected to the processing sets 14 and 16 by P buses 24.3 and 26.3, respectively. Similarly, the bridge 12 is connected to the processing sets 14 and 16 by P buses 24.4 and 26.4, respectively. The bridge 12.3 is connected to an IO databus (D bus) 22.3 and the bridge 12.4 is connected to an IO databus (D bus) 22.4.

There have been described embodiments of a computer system that includes memory and at least a first processor that includes a memory management unit. The memory management unit includes a translation table having a plurality of translation table entries for translating processor addresses to memory addresses. The translation table entries provide first and second memory address translations for a processor address. The memory management unit can enable either the first translation or the second translation to be used in response to a processor address to enable data to be written simultaneously to different memories or parts of a memory. A first translation addresses could be for a first memory and a second translation addresses could be for a second backup memory. The backup memory could then be used in the event of a fault.

Although particular embodiments of the invention have been described, it will be appreciated that many modifications/additions and/or substitutions may be made within the spirit and scope of the invention.

Although in the above examples reference is made to first and second memories, or primary and secondary memories, it will be appreciated that other embodiments could employ more than a pair of main and backup memories (duplicate memories). For example, if three sets of data are stored in each of three memories, then when one memory suffers a fault, the faulty memory can be identified simply by voting between the outputs of all three memories.

Moreover, it will be appreciated from the diverse embodiments shown that the present invention finds application in many different sorts of computer system that have single or multiple processors.

For example, in the embodiments of FIGS. 11 and 15, each processing set may have a different configuration from that shown.

More generally, the invention can be applied to a Non-Uniform Memory Architecture (NUMA) multiprocessor computing system where local and remote copies of memory are maintained. Writes can be made to the local and remote copies of memory, with reads preferably being effected from a local copy of memory.

Also, although in the embodiments described, the first and second memories addressed by the respective data words of the dual data word TTE are physically separate memories, in other embodiments these memories can be respective portions of a single memory.

One or more bits in the first and second data words of the TTEs could be used to form status storage for containing indicators as to which of the first translation and the second translations are to be used in response to a processor address at a given time, or as generated by a given principal, to be able selectively to control which of the first and/or second physical address translations are used in response to a processor address.

What is claimed is:

1. A computer system comprising memory and at least a first processor that includes a memory management unit, which memory management unit includes a translation table having a plurality of translation table entries for translating processor addresses to memory addresses with at least one translation table entry providing at least a first memory address translation and a second, different, memory address translation for a processor address, wherein the memory management unit is operable selectively to enable both the first translation and the second translation to be used in response to the processor address to provide simultaneous addressing of different parts of memory.

2. The computer system of claim 1, wherein all translation entries provide first and second translations for a processor address.

3. The computer system of claim 1, wherein the memory management unit is operable selectively to enable either the first translation or the second translation to be used in response to the processor address, to provide selectable addressing of different parts of memory.

4. The computer system of claim 1, wherein the memory management unit is programmable on a per translation basis to determine which of the one or more translations are to be active to provide addressing of different parts of memory.

5. The computer system of claim 1, wherein the memory management unit includes status storage containing indicators as to which of the first translation and the second translations are to be used in response to a processor address.

6. The computer system of claim 1, wherein the first translation addresses a first memory and the second translation addresses a second memory, separate from the first memory.

7. The computer system of claim 6, wherein the first memory is a memory local to the first processor and the second memory is a memory local to a second processor interconnected to the first processor via an interconnection.

8. The computer system of claim 7, wherein the interconnection is a bridge that interconnects an IO bus of the first processor to an IO bus of the second processor.

9. The computer system of claim 6, wherein the memory management unit is operable in response to a replication instruction at a processor address to read from a first memory location in the first memory identified by the first translation for the processor address and to write to a second memory location in the second memory identified by the second translation for the processor address.

10. The computer system of claim 6, wherein the memory management unit is operable in response to a replication instruction at a processor address to read from a first memory location in the first memory identified by the first translation for the processor address and to write to the first memory identified by the first translation and to a second memory location in the second memory identified by the second translation for the processor address.

11. The computer system of claim 6, wherein the first memory is a main memory for the first processor and the second memory is a backup memory.

12. The computer system of claim 10, wherein second memory is a memory local to a second processor interconnected to the first processor via an interconnection.

13. The computer system of claim 12, wherein the interconnection is a bridge that interconnects an IO bus of the first processor to an IO bus of the second processor.

14. The computer system of claim 6, wherein the memory management unit is operable in response to a read instruction at a processor address to read from a first memory location in the first memory identified by the first translation for the processor address and is operable in response to a write instruction at a processor address to write to a first memory location in the first memory identified by the first translation and to a second memory location in the second memory identified by the second translation for the processor address.

15. The computer system of claim 1, comprising a plurality of processors interconnected by an interconnection, each processor comprising a respective memory management unit that includes a translation table having translation table entries providing at least first and second memory translations for a locally generated processor address each first memory translation relating to the memory local to the processor to which the memory management unit belongs, and each second memory translation relates to the memory local to the another processor.

16. The computer system of claim 8, wherein the plurality of processors are operable in lockstep.

17. The computer system of claim 1, further comprising an IO memory management unit, the IO memory management unit including a translation table with a plurality of IO translation table entries for translating IO addresses to memory addresses, wherein at least one IO translation table entry provides at least a first memory address translation and a second, different, memory address translation for an IO address.

18. A method of generating an image of locations in a memory of a computer, the method comprising:
    a first processor generating predetermined instructions identifying processor addresses; and
    a memory management unit responding to a said processor address by selectively enabling both a first and a second translation of the processor address to be used in response to the processor address and providing, from a translation table entry for the processor address, said first translation for a read from a first memory location;
    reading of contents of the first memory location;
    the memory management unit further providing from said translation table entry for said processor address, said second translation for a write of the content of the first memory location to a second memory location;
    writing of the content of the first memory location to said second memory location; and
    rewriting of the content of the first memory location to the first memory location.

19. The method of claim 18, wherein the first address translation addresses a first memory and the second translation addresses a second memory, separate from the first memory.

20. The method of claim 19, wherein the first memory is a memory local to the first processor and the second memory is a memory local to a second processor interconnected to the first processor via an interconnection.

21. The method of claim 20, wherein the interconnection is a bridge that interconnects an IO bus of the first processor to an IO bus of the second processor.

22. The method of claim 21, wherein the first memory is a main memory for the first processor and the second memory is a backup memory.

23. The method of claim 22, wherein second memory is a memory local to a second processor interconnected to the first processor via an interconnection.

24. The method of claim 18, wherein a plurality of processors are interconnected by an interconnection, each processor comprising a respective memory management unit that includes a translation table having translation table entries providing at least first and second memory translations for a locally generated processor address each first memory translation relating to the memory local to the processor to which the memory management unit belongs, and each second memory translation relates to the memory local to the another processor.

25. The method of claim 24, wherein the interconnection is a bridge that interconnects an IO bus of each of the processors.

26. The method of claim 24, operable to establish an equivalent memory state in the local memory of each of the processors, whereinafter the processors are operable in lockstep.

27. A computer system comprising memory means and at least first processor means that include a memory management means, which memory management means includes translation table means having a plurality of translation table entries for translating processor addresses to memory addresses with at least one translation table entry providing at least a first memory address translation and a second, different, memory address translation for a processor address, wherein the memory management means is operable selectively to enable both the first translation and the second translation to be used in response to the processor address to provide simultaneous addressing of different parts of memory.

28. A method of managing memory in a computer system, the method comprising providing a translation table having a plurality of translation table entries for translating processor addresses to memory addresses with at least one translation table entry providing at least a first memory address translation and a second, different, memory address translation for a processor address, and selectively enabling both the first translation and the second translation to be used in response to the processor address to provide simultaneous addressing of different parts of memory.

29. A computer system comprising memory and at least a first processor that includes a memory management unit, which memory management unit includes a translation table having a plurality of translation table entries for translating processor addresses to memory addresses with at least one translation table entry providing at least a first memory address translation and a second, different, memory address translation for a processor address, wherein the first translation addresses a first memory and the second translation addresses a second memory, separate from the first memory and wherein the memory management unit is operable in response to a replication instruction at a processor address to read from a first memory location in the first memory identified by the first translation for the processor address and to write to a second memory location in the second memory identified by the second translation for the processor address.

30. A computer system comprising memory and at least a first processor that includes a memory management unit, which memory management unit includes a translation table having a plurality of translation table entries for translating processor addresses to memory addresses with at least one translation table entry providing at least a first memory address translation and a second, different, memory address translation for a processor address, wherein the first translation addresses a first memory and the second translation addresses a second memory, separate from the first memory and, wherein the memory management unit is operable in response to a replication instruction at a processor address to read from a first memory location in the first memory identified by the first translation for the processor address and to write to the first memory identified by the first translation and to a second memory location in the second memory identified by the second translation for the processor address.

31. The computer system of claim 30, wherein said second memory is a memory local to a second processor interconnected to the first processor via an interconnection.

32. The computer system of claim 31, wherein the interconnection is a bridge that interconnects an IO bus of the first processor to an IO bus of the second processor.

33. A computer system comprising memory and at least a first processor that includes a memory management unit, which memory management unit includes a translation table having a plurality of translation table entries for translating processor addresses to memory addresses with at least one translation table entry providing at least a first memory address translation and a second, different, memory address translation for a processor address, wherein the first translation addresses a first memory and the second translation addresses a second memory, separate from the first memory, and wherein the memory management unit is operable in response to a read instruction at a processor address to read from a first memory location in the first memory identified by the first translation for the processor address and is operable in response to a write instruction at a processor address to write to a first memory location in the first memory identified by the first translation and to a second memory location in the second memory identified by the second translation for the processor address.

* * * * *